United States Patent [19]

Lagardere et al.

[11] 4,237,174
[45] Dec. 2, 1980

[54] WRAP-AROUND DEVICES

[76] Inventors: Bruno J. F. Lagardere, 12 ter, rue Raymond Houdoux, 95540 Mery sur Oise, France; Richard C. Sovish, rue du Coteau, 10 1420 Braine l'Alleud, Belgium

[21] Appl. No.: 971,260

[22] Filed: Dec. 20, 1978

[30] Foreign Application Priority Data

Dec. 23, 1977 [GB] United Kingdom ............ 53703/77

[51] Int. Cl.² .............. F16L 25/02; H01B 7/00; B29C 27/02
[52] U.S. Cl. .................. 428/99; 24/265 BC; 138/168; 174/DIG. 8; 264/230; 285/381; 403/28; 428/138
[58] Field of Search ......... 264/230, 285; 428/77, 428/99, 131, 134, 138, 24; 403/28; 24/265 A, 265 BC; 174/DIG. 8, DIG. 11; 138/99, 168; 285/381

[56] References Cited

U.S. PATENT DOCUMENTS

| 2,027,962 | 1/1936 | Currie .................. 264/230 |
| 2,992,457 | 7/1961 | Harrison ............... 264/230 |
| 3,086,242 | 4/1963 | Cook et al. ........... 264/230 |
| 3,243,211 | 3/1966 | Wetmore ............... 403/28 |
| 3,379,218 | 4/1968 | Conde .................. 138/99 |
| 3,396,460 | 8/1968 | Wetmore ............... 264/230 |
| 3,455,336 | 7/1969 | Ellis ..................... 138/156 |
| 3,467,761 | 9/1969 | Plummer ............... 174/36 |
| 3,530,898 | 9/1970 | Wilson .................. 138/99 |
| 3,542,077 | 11/1970 | Muchmore ............ 138/99 |
| 3,574,313 | 4/1971 | Tanaka .................. 138/99 |
| 3,619,478 | 11/1971 | Staiger .................. 264/230 X |
| 3,770,556 | 11/1973 | Evans et al. .......... 138/99 |
| 4,135,553 | 1/1979 | Evans et al. .......... 138/99 X |
| 4,144,404 | 3/1979 | DeGroef et al. ...... 285/381 X |
| 4,151,364 | 4/1979 | Ellis ..................... 174/DIG. 8 |
| 4,163,117 | 7/1979 | Campbell et al. .... 285/381 X |
| 4,174,563 | 11/1979 | Simpson ............... 174/DIG. 8 |

FOREIGN PATENT DOCUMENTS 1503328 3/1978 United Kingdom .

*Primary Examiner*—Harold Ansher
*Attorney, Agent, or Firm*—Lyon & Lyon

[57] ABSTRACT

A heat-recoverable wrap-around device made from heat-shrinkable sheet material is provided with mechanical retaining means which co-operate with opposed edge regions of the sheet material so that after recovery about a substrate such as an electrical cable, the device lies substantially flush with the substrate without protuberances. The mechanical retaining means is preferably a buckle which is shaped to conform with the substrate and in which the sheet material is held by frictional forces.

27 Claims, 27 Drawing Figures

WRAP-AROUND DEVICES

This invention relates to heat-recoverable articles, especially so-called "wrap-around" devices.

Heat-recoverable articles, especially heat-shrinkable articles, are now widely used in may areas where insulation, sealing and encapsulation are required. Usually these articles recover, on heating, towards an original shape from which they have previously been deformed, but the term "heat-recoverable" as used herein also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, as described, for example, in British Pat. No. 1,440,524, an elastomeric member such as an outer tubular member is held in a stretched state by a second member, such as an inner tubular member, which, upon heating, weakens and thus allows the elastomeric member to recover.

Heat-shrinkable sleeves find many applications, especially in the connection and termination of wires, cables and pipes. However, there are other applications where it is desirable to provide a connecting, insulating or protective heat-recoverable member for elongated objects such as cables and pipes where the ends are not accessible or, if they are accessible, where it is undesirable to disconnect or otherwise displace them. For such applications so-called "wrap-around" sleeves have been developed. Basically these are heat-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protuberances adjacent to the overlapping edges of the heat-recoverable sheet. Various types of fastening means are described, for example, in U.S. Pat. No. 3,379,218 and British Pat. Nos. 1,155,470; 1,211,988 and 1,346,479. In other applications the sheet may be held in the wrapped-up configuration during recovery by means of an adhesive which may, in some cases, be applied on site.

Wrap-around devices of the type described above have been successfully employed in many applications. However, they have certain disadvantages which make them less suitable in other applications. For example, the use of an adhesive may not always be convenient and, in addition, the bond strength is not always sufficient to retain the wrapped-up configuration during recovery. On the other hand, the use of the mechanical fastening means proposed until now has in general necessitated the formation of the sheets with co-operating protuberances adjacent their opposite edges. The necessary extruded profile of the protuberances adds considerably to the cost of production of the sheets and, in addition, the presence of the protuberances on the outside of the completed closure often causes other problems, especially in cramped environments.

U.S. Pat. Nos. 3,530,898 and 3,574,313 and French Patent Publication No. 2,332,599 propose wrap-around devices in which the fastening means at one edge co-operate with holes at the other edge. These devices have the disadvantage that they cannot readily be fabricated by inexpensive extrusion processes, but must be made by moulding. In addition, the strains imposed on the holes during recovery may lead to tears which propagate and render the article useless.

The present invention is based on our surprising observation that effective heat-recoverable wrap-around devices using mechanical retaining means can be made from heat-recoverable sheet material in a manner which does not necessitate the provision of holes in the sheet material and in which the surface of the device after recovery lies more or less flush with the surface of the substrate, i.e. no protuberances extend from the surface of the recovered device.

The present invention accordingly provides a wrap-around device which comprises heat-recoverable sheet material and mechanical retaining means adapted to co-operate with opposed edge regions of the sheet material so that the surface of the device after recovery about a substrate lies substantially flush with the substrate without protuberances from its outer surface the mechanical retaining means being provided with means for receiving and engaging an electrical component such as an earth lead in order to connect the component electrically to the substrate.

The present invention also provides a method of making a connection to a substrate using such a wrap-around device and a connection made by such a method.

An important factor in the present invention is that the mechanical retaining means does not need to pass through the body of the heat-recoverable member and thus the need for one or more holes across the width of the sheet or for moulded or extruded protuberances at the edges of the heat-recoverable sheet is obviated. In this respect the mechanical retaining means generally comprises two sections which engage the opposite ends of the heat-recoverable sheet material. These sections comprise tines which pass through loops in the sheet material or are provided with slots through which the sheet material passes. In both such embodiments the heat-recoverable sheet material may be regarded as passing around the sections and, in many cases, it is engaged by frictional forces. The retaining means is preferably flat, e.g. is made from sheet material, and is shaped, or is deformable, so that is conforms with the surface of the substrate.

One manner in which the mechanical retaining means and the sheet material may co-operate to form a flush configuration with a substrate is for the retaining means to act as a buckle through which the heat-recoverable sheet passes and is held by frictional forces. The buckle, which may if desired be contoured, e.g. curved, for conformity with the surface of the substrate, or which may be deformable enough that it adopts the desired curved configuration during recovery, may comprise one or more slots through which the sheet passes. In certain applications, it may be advantageous for the nature of the slots to be different, for example, the slots may be closed or open-ended. By this means, for example, it may be possible to attach the buckle to one end of the heat-recoverable sheet before it is wrapped around the substrate, thus facilitating installation. It will be appreciated that such a buckle arrangement will be especially appropriate when the width of the heat-recoverable sheet is small, for example, where the device acts as a wrap-around tie rather than as an insulative or protective closure. In this respect it will be appreciated that the term "opposed edge regions" as used herein, means the opposed regions of the heat-recoverable sheet whereby they engage the mechanical retaining means and does not imply that these regions are necessarily at the end or edge of the sheet itself.

In one especially preferred embodiment of the present invention, the wrap-around device acts to make an electrical connection, especially a soldered connection, of, for example, an earth lead, to the conductive sheath of an electric cable. In such an application, the buckle is advantageously made from an electrically conductive material, e.g. a metal such as copper and, preferably, is provided with means for receiving the earth lead to facilitate the formation of the connection. Such means may, for example, be provided by cutting or otherwise forming the buckle to provide a small bridge member under which the earth lead passes so as to be held against the remainder of the buckle by resilient and/or frictional forces or, for example, by providing it with one or more slots in which the earth lead is held in a manner similar to that in which the heat-recoverable sheet is held.

The end of the earth lead may be tinned prior to inserting it in the buckle and/or the buckle itself may be provided with a solder preform. If these measures are taken it is possible to effect recovery and form a soldered connection in a single operation, which is especially advantageous.

Attention is drawn in this respect to co-pending Application Ser. No. 971,261, inventor Bruno Lagardere, filed today claiming priority from British Patent Application No. 53702/77, which describes and claims methods of forming electrical connections to continuous substrates such as supply lines, e.g. the conductive sheathing of electric cables, especially co-axial cables, using wrap-around devices in which the mechanical retaining means form part of the electrical connection. Many of the devices of the present invention are suitable for use in such methods.

Another manner in which the mechanical retaining means may co-operate with the heat-recoverable sheet material in accordance with the present invention is for the sheet to be provided with loops at each opposed edge and for the retaining means to comprise two connected tines each of which passes through a loop to hold the sheet in the wrapped around configuration. The retaining device may, for example, be suitably formed as a hairpin but the tines may, in other applications, advantageously form part of a buckle as described above.

Accordingly, in another aspect, the present invention provides a heat-recoverable wrap-around device in which the heat-recoverable sheet material is provided at one or both of its edge regions with a loop which co-operates with a retaining device to form the fastening means. Preferably, in this aspect of the invention, each edge region is provided with an integral loop but, in some cases, one or both of the loops may be formed by simple folding.

Attention is drawn in this respect to copending Application Ser. No. 971,559 inventor Francois Biscop, filed today claiming priority from British Patent Application No. 53704/77, which describes wrap-around devices in which the two regions of the sheet material which are secured together by a fastening means prior to recovery are each provided with a strip of relatively rigid sheet material, for example made from metal and in which strips, which lie generally in the plane of the sheet material, co-operate to form the fastening means or a part thereof. The provision of loops on the heat-recoverable sheet material in accordance with the present invention is especially advantageously applied to the devices described in that application and it will be appreciated that the fastening means described in that application are especially useful in the present invention.

In certain applications it may be preferable to provide a hairpin-type retaining device with means for ensuring that the tines are not forced apart during recovery. In yet other applications it may be advantageous to employ two or more fastening means, for example two hairpin-type devices may be employed to ensure that the wrap-around device remains correctly positioned during recovery.

It will be appreciated that, in certain applications, it may be advantageous to combine the "loop" and "buckle" systems. For example, the heat-recoverable sheet may be securely fastened at one edge to a buckle by means of a loop, and at the other edge by frictional means or by means of a loop which may be detachably engaged to a tine forming part of the buckle.

The loops may be formed from flat sheet by folding, preferably followed by bonding, for example by ultrasonic welding or, in certain embodiments, by providing the heat-recoverable sheet member as a tube which becomes flattened during the wrap-around operation to leave two edge loops in its flattened configuration.

Such "loop" systems can suitably be applied to the formation of wrap-around ties or to wrap-around closures. If a simple tie is required it may not be necessary for the sheet material to overlap, although for a closure this will generally be necessary. It will be appreciated, however, that the "loop" system can accommodate both arrangements as, indeed, can the "buckle" systems.

Depending on the application concerned, the heat-recoverable sheet material can be made from any of the polymers known from the art to be useful for the production of heat-recoverable articles. Generally the sheet material will be of constant composition throughout; however laminates of two different polymers bonded or fused together may be used in certain instances. Amongst suitable polymers there may be mentioned, for example, polyolefins, especially polyethylene, copolymers of ethylene and vinyl acetate, copolymers of ethylene and ethyl acrylate; chlorinated and fluorinated polymers, especially polyvinyl chloride, polyvinylidene fluoride and polymers incorporating units from vinylidene fluoride, hexafluoroethylene and chlorotrifluoroethylene; and rubbers such as ethylene/propylene rubber, chlorinated rubbers, e.g. Neoprene, and silicone rubbers which may be used in a blend with a crystalline or glassy polymer such as an olefin polymer. All of the above materials may, if desired, be cross-linked for example by irradiation and/or chemical means.

In certain applications, the internal surface of the wrap-around sheet material may, of course, be provided with a coating of an adhesive or a sealant such as a hot-melt adhesive or a mastic. Especially suitable hot-melt adhesives include, for example, polyamides, ethylene-vinyl acetate copolymers and terpolymers (with or without incorporated waxes) and polyesters. Such materials are described, for example, in British Pat. No. 1,440,810 and German OS 2,709,717. Also suitable are curable adhesives which melt and flow on heating but which will not afterwards be hot-meltable. There may also be mentioned epoxy resins and conventional mastics such, for example, as those based on butyl and isobutylene rubbers modified with suitable materials known in the art. Obviously the use or otherwise of such materials and their type, if chosen, will depend upon the particular requirements in any given case.

The nature of the mechanical retaining means will also depend on the application. Where, as in certain preferred cases, it is to be used also to make an electrical connection it will preferably be formed as a strap or buckle made from thin conductive sheet, e.g. soft copper sheet, which can be bent for conformity with the substrate. The strap or buckle can, if desired, be coated with a plastics film in one or more parts for insulative purposes or to facilitate assembly. Where, as in other applications, it is provided with tines to hold together the loops of the heat-recoverable sheet material, it should obviously be sufficiently rigid to prevent the recovery forces from pulling the loops apart.

It will be appreciated that whilst, in certain applications, it may be appropriate for the retaining means to be formed integrally with or to be otherwise attached to the heat-recoverable sheet in most cases it will be preferred that the heat-recoverable sheet be formed in a simple manner in order to keep production costs as low as practicable, which is one of the main advantages provided by the present invention. For this reason the retaining means will generally be provided as a separate member.

Amongst other advantages there may especially be mentioned the ease of installation of the devices which are more or less independent of manufacturing tolerances and other factors contributing to the lack of versatility of the previously proposed mechanical fastening systems for wrap-around devices. In addition, especially when a buckle-type retaining member is employed it is possible for the device to accommodate various sizes of cable. Notwithstanding the fact that the high degree of recovery itself allows the devices of the present invention to be used with substrates of various girths, the use of a buckle enables an operator to position the device accurately and tightly around the substrate prior to recovery. In the preferred application in which the device is used to make a soldered connection to a screen to the coaxial cable in a single heating operation the use of a buckle helps to retain the solder in position, which is a problem with large sleeves.

Various embodiments of the present invention will now be described, by way of example only, with reference to the accompanying drawings, in which.

Figure 1A:
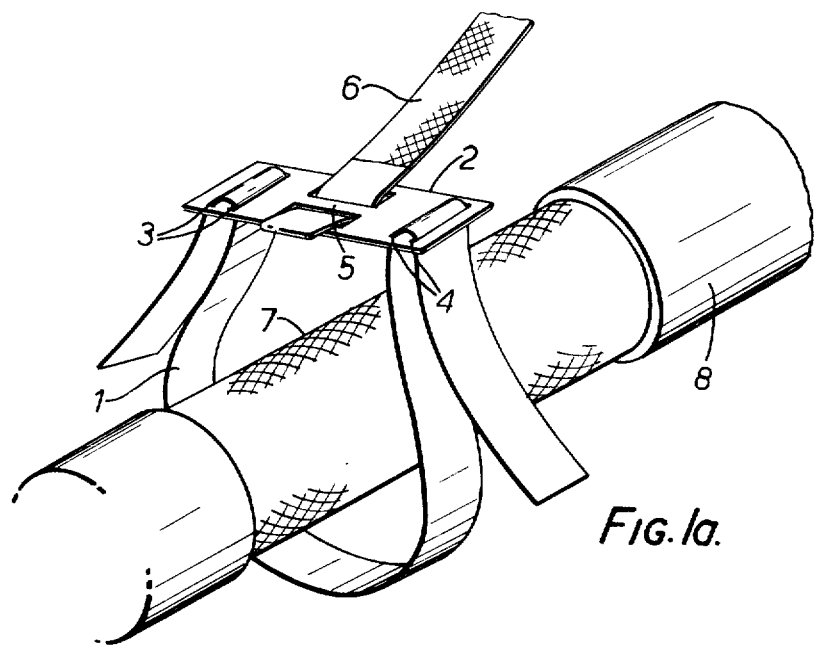
FIGS. 1a and 1b illustrate one form of wrap-around device and its use in making an electrical connection.
Figure 1B:
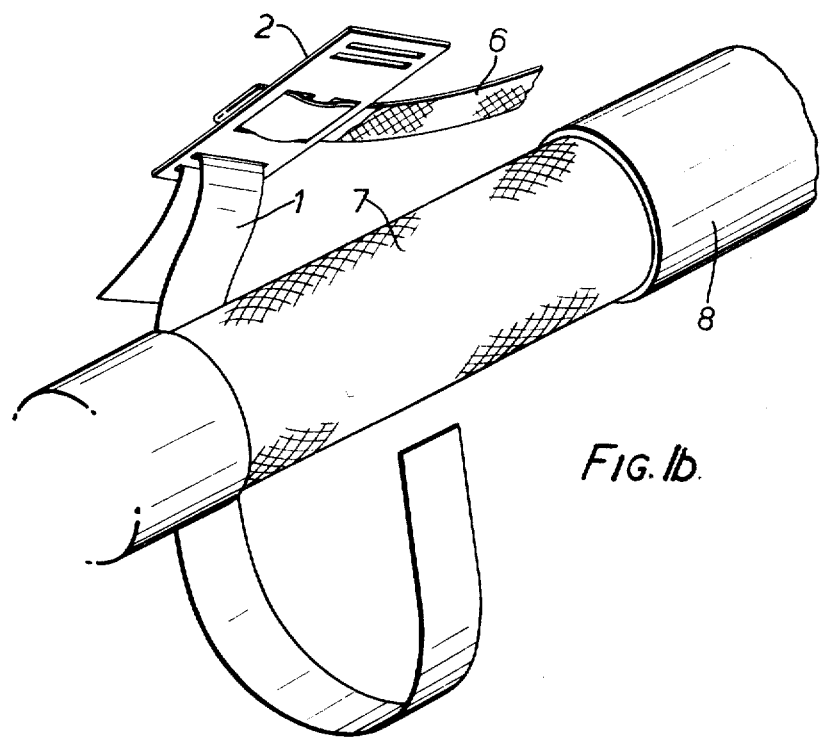

Referring now to the drawings, FIGS. 1a and 1b show a wrap-around device according to the present invention comprises a strip of heat-recoverable material 1 which is heat-shrinkable in its longitudinal direction and a mechanical retaining means in the form of a thin metal buckle 2. The buckle is provided wih two sets of closed slots 3 and 4 through which the heat-recoverable strip passes. It is also formed to provide a central bridge 5. As shown, an earth lead 6 is held against the buckle 2 by this bridge 5. It will be appreciated that the device is capable of adaptation to substrates of various sizes because the length of the strip 1 may readily be varied.

This wrap-around device may be used to form an earth connection to the conductive sheath 7 of a cable 8. The device is assembled with the earth lead 6 as shown, for example in FIG. 1b, and is then wrapped about the sheath 7 as shown in FIG. 1a. Heat is then applied causing the strip 1 to shrink longitudinally and thus form the desired connection.

Figure 2A:
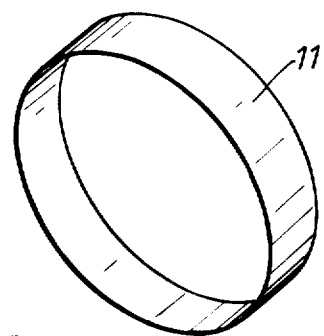
FIGS. 2a to 2d illustrate a second form of wrap-around device and its use in making an electrical connection.
Figure 2B:
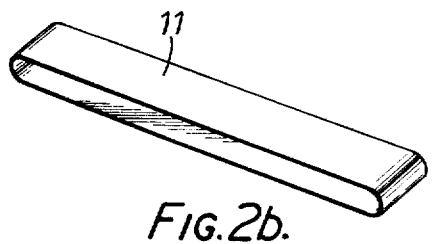
Figure 2C:
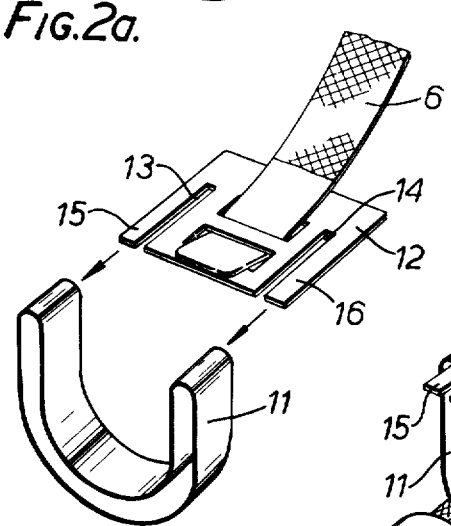
Figure 2D:
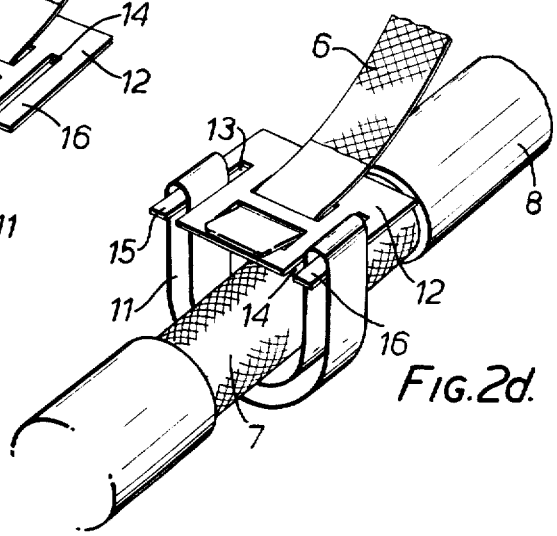

FIGS. 2a to 2d illustrate a somewhat similar form of device except that in this case the heat-shrinkable member is made from a heat-shrinkable tube 11 as shown in FIGS. 2a to 2c and that the buckle 12 is provided with two open-ended slots 13 and 14 so that tines 15 and 16 respectively may pass into the loops formed at the edges of the flattened tube 11. The assembly may be used to make an earth connection as shown, before recovery, in FIG. 2d.

Figure 3A:
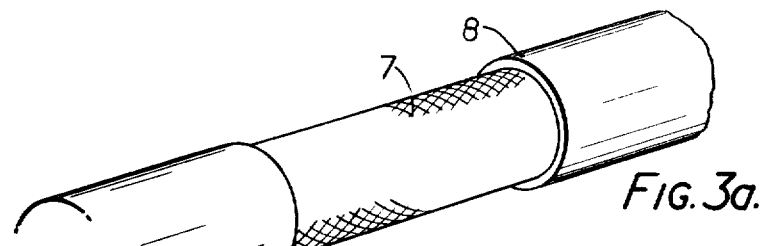
FIGS. 3a to 3e illustrate a third form of wrap-around device and its use in making an electrical connection.
Figure 3B:
Figure 3C:
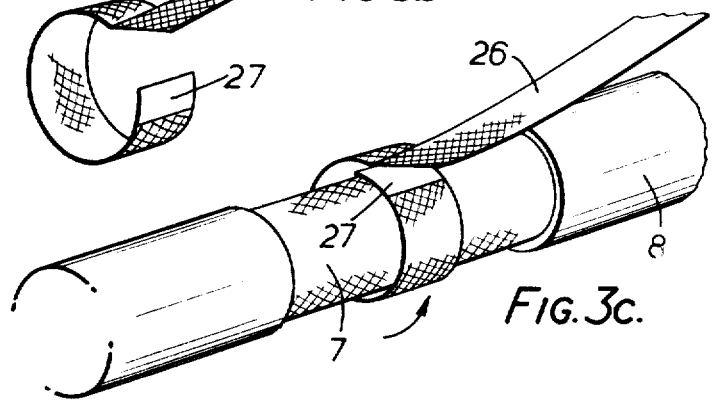
Figure 3D:
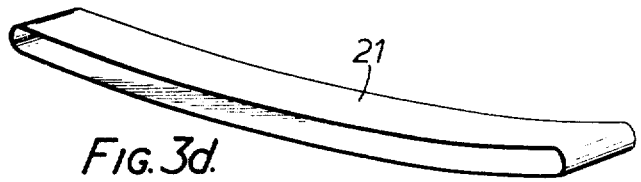
Figure 3E:
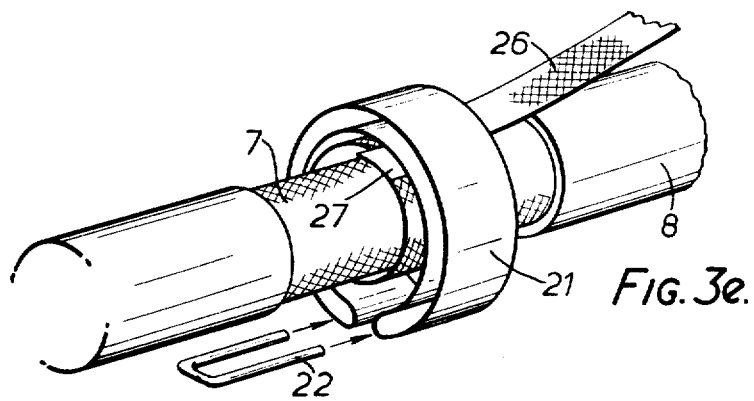

In FIGS. 3a to 3e there is illustrated a method of making an earth connection using a third form of wrap-around device according to the present invention. In this case, as is shown in FIGS. 3a to 3c, the earth connection between the sheath 7 of cable 8 and earth lead 26, which may be a tinned copper braid, is made first. For this purpose, the end 27 of braid 26, is advantageously provided with solder. When the connection has been effected it is covered using the wrap-around device shown in FIGS. 3d and 3e which comprises a flattened heat-shrinkable tube 21 and a retaining means in the form of a hairpin 22 the tines of which pass through the edge loops of the flattened tube 21 to hold it in position during recovery.

FIGS. 4a to 4d show a further wrap-around device according to the present invention. This comprises a longitudinally heat-shrinkable strip 31 and a metal buckle 32 which is advantageously made from thin soft copper. As can be seen the width of strip 31 is greater than that of buckle 32 as, in this embodiment the strip is designed completely to cover the electrical connection made.

Figure 4A:
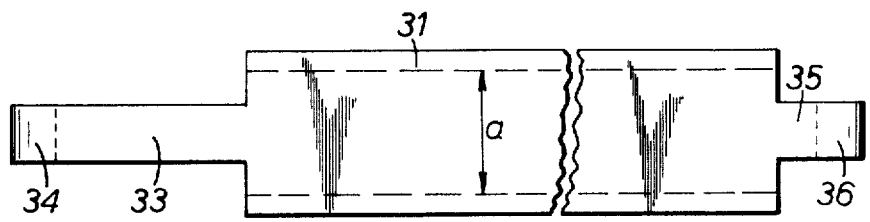
FIGS. 4a to 4d illustrate a fourth form of wrap-around device.
Figure 4B:
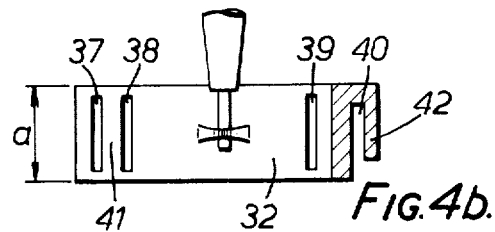
Figure 4C:
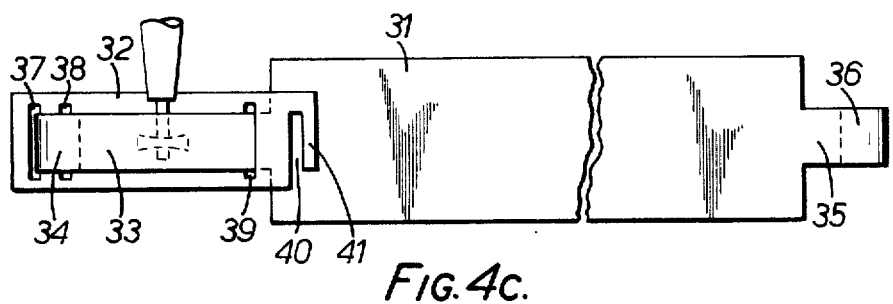
Figure 4D:
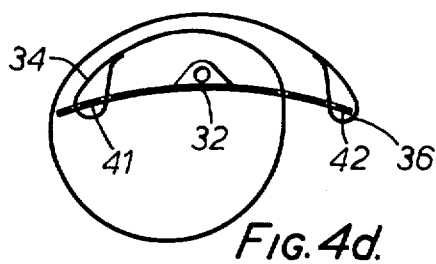

For this purpose, as can be seen from FIG. 4d, the arrangement is such that strip 31 overlaps itself when positioned on buckle 32. The strip comprises a longer end portion 33 provided with a tack-welded terminal loop 34 and a shorted end portion 35 provided with a tack-welded terminal loop 36. The width of end portions 33 and 35 is less than that of buckle 32 as they are designed to pass through the closed slots 37, 38 and 39 and the open-ended slot 40 of the buckle, respectively.

As shown in FIG. 4c, the device may be provided assembled with loop 34 surrounding the arm 41 between slots 37 and 38 after having been passed through slot 39, the tack-weld being formed in situ. Being made from thin soft copper the buckle 32 may bend to conform to a substrate, as shown in FIG. 4d, and it may advantageously be coated with a thin film of a plastics material in the vicinity of open-ended slot 40 for electrical insulation purposes.

Prior to recovery, the device is assembled in the wrapped tubular configuration shown in FIG. 4d with tine 42 of bracket 32 passing through loop 36 of heat-shrinkable strip 31. The edge portions of strip 31 bordering the dotted lines in FIG. 4e may be adhesive coated to provide an environmental seal.

Figure 5A:
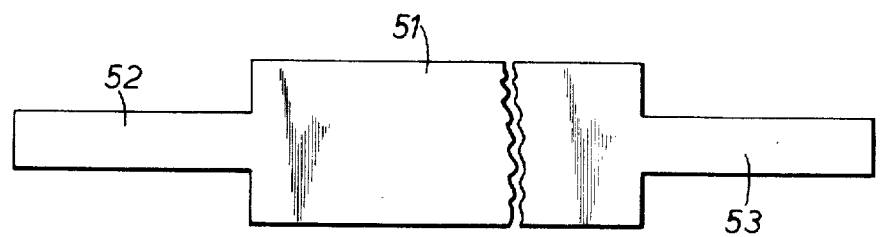
FIGS. 5a to 5d illustrate a similar form of wrap-around device.
Figure 5B:
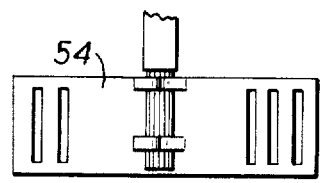
Figure 5C:
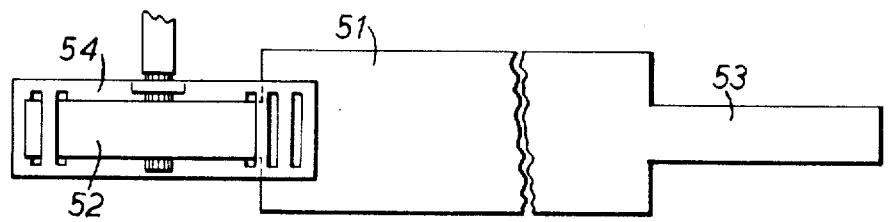
Figure 5D:
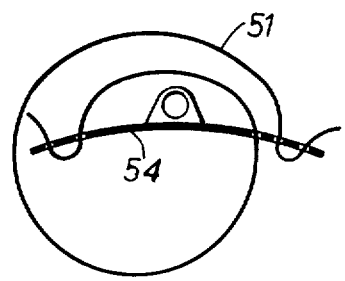

The wrap-around device shown in FIGS. 5a to 5d is similar to that shown in FIGS. 4a to 4d. The difference is that the sheet member 51 is provided with terminal tags 52 and 53 which are not provided with loops. Because of this the buckle 54 may be provided with closed slots as shown and the device may be assembled and positioned about a substrate as illustrated in FIGS. 5c and 5d. The absence of the terminal loops makes the construction of the device simpler and less expensive and, in addition, means that the device can more readily accommodate various sizes of cable.

Figure 6:
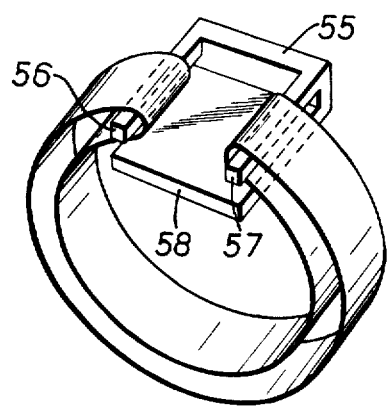
FIG. 6 illustrates yet another form of wrap-around device in accordance with the present invention.

In the wrap-around device shown in FIG. 6, the retaining means comprises a clip 55 which operates on the hairpin principle in that it is provided with two parallel tines 56 and 57. However, in this case the retaining clip is additionally provided with a base portion 58 which extends beneath the tines 56 and 57 and, as shown, operates to provide a sealing flap for the completed closure. The retaining clip 55 may be made from a plastics material or from metal in which case it may form part of an electrical connection as discussed above.

Figure 7:
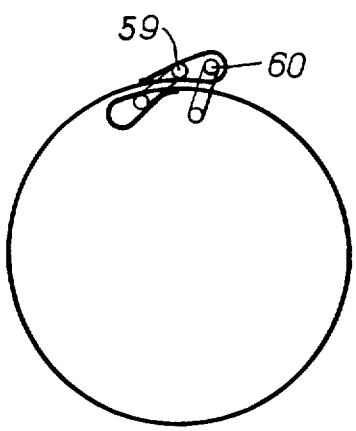
FIG. 7 illustrates a wrap-around device in which two fastening members are employed.

In FIG. 7 there is shown how a single strip of heat-recoverable material provided with terminal loops may be used to form a wrap-around closure. As shown, two hairpin clips 59 and 60 are provided. Hairpin clip 60 ensures that on recovery there is no rotation of clip 59 which would lead to an unsealed closure of the type shown in, for example, FIG. 3.

In FIG. 8, there is shown wrap-around device in which a similar closure can be obtained using only a single hairpin clip. In this case the heat-recoverable strip 61 is first of all folded into the position shown in FIG. 8a. As shown in FIG. 8b, welds are then made at positions 62, 63 and 64 and then the material is cut adjacent weld 64 so as to provide the heat-recoverable strip shown in FIG. 8c including a terminal flange portion 65 as well as two loops 66 and 67.

Figure 8A:
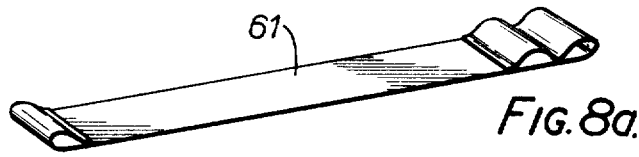
FIGS. 8a to 8d illustrate a similar form of wrap-around device using only one fastening member.
Figure 8B:
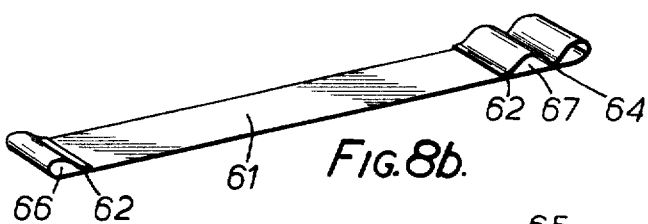
Figure 8C:
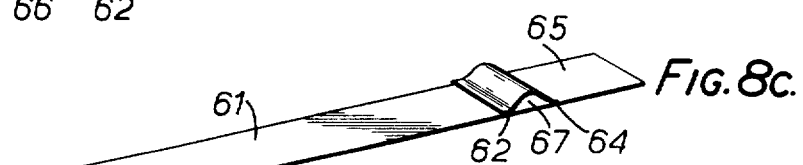
Figure 8D:
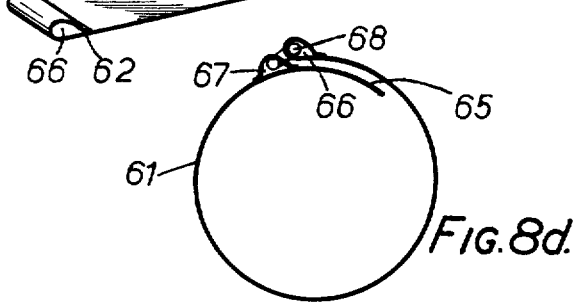

As shown in FIG. 8d, the strip can then be wound round a substrate and fastened with a hairpin clip 68, the flange portion 65 providing the necessary encapsulation.

Figure 9A:
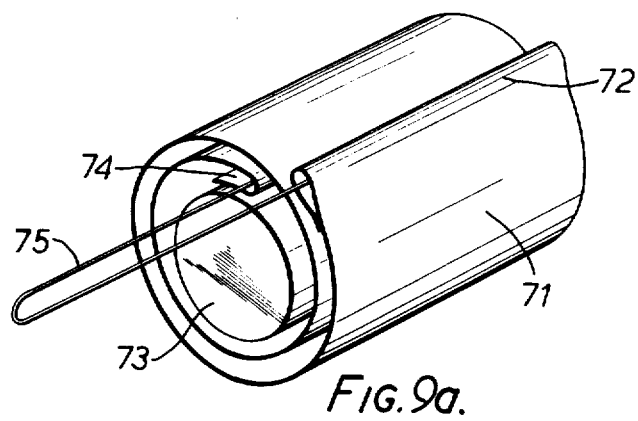
FIGS. 9a and 9b illustrate a further form of wrap-around device using only one fastening member.
Figure 9B:
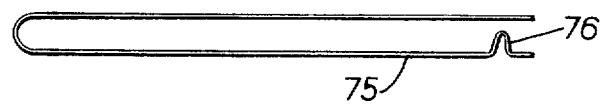

Finally, in FIG. 9 there is shown a somewhat similar form of wrap-around closure in which heat-recoverable sheet 71 is provided with a terminal loop 72 only at one end. In this embodiment the sheet 71 is wrapped around substrate 73 so as to form an inner fold 74 into which one tine of hairpin fastening member 75 may be inserted before the sheet is tightened and recovery is effected. Obviously, the fold 74 could be replaced by a preformed loop with similar results.

One tine of the hairpin 75 is provided with a catch 76, about which the end of the other tine may be bent to effect fastening. Other methods of achieving this will be apparent to those skilled in the art.

We claim:

1. A wrap-around device which comprises heat recoverable sheet material and mechanical retaining means adapted to cooperate and engage opposed edge regions of the sheet material so that the surface of the device after recovery about a substrate lies substantially flush with the substrate without protuberances from its outer surface, the mechanical retaining means being provided with means for receiving and engaging an electrical component to electrically connect the component to the substrate.

2. A wrap-around device as claimed in claim 1, wherein the heat-recoverable sheet material is held within the mechanical retaining means by frictional forces.

3. A wrap-around device as claimed in claim 1, wherein the mechanical retaining means is provided with a solder preform.

4. A wrap-around device as claimed in claim 1, wherein one or more parts of the mechanical retaining means is provided with a plastics coating.

5. A wrap-around device as claimed in claim 1, wherein the width of the heat-recoverable sheet material is greater than the width of the mechanical retaining means and the arrangement is such that the mechanical retaining means can be insulated by the sheet after recovery.

6. A wrap-around device as claimed in claim 1, wherein the mechanical retaining means is formed integrally with or is otherwise attached to the heat-recoverable sheet material.

7. A wrap-around device as claimed in claim 1, wherein the mechanical retaining means comprises a hair-pin member.

8. A wrap-around device as claimed in claim 7, wherein the hair-pin is provided with means for ensuring that its tines are not forced apart during recovery.

9. A wrap-around device as claimed in claim 1, wherein the mechanical retaining means comprises two sections each of which engages an edge region of the heat-recoverable sheet material.

10. A wrap-around device as claimed in claim 9, wherein at least one of said sections comprises a tine which passes through a loop in the heat-recoverable sheet material.

11. A wrap-around device as claimed in claim 10, wherein the loop is formed at the edge of a tube of heat-recoverable material flattened to form a dual-walled sheet.

12. A wrap-around device as claimed in claim 10, wherein the loop is formed by folding back the heat-recoverable sheet material.

13. A wrap-around device as claimed in claim 12, wherein the loop is completed by bonding.

14. A wrap-around device as claimed in claim 9, wherein at least one of said sections comprises a slot through which the heat-recoverable sheet material passes.

15. A wrap-around device as claimed in claim 14, wherein the slot has an open end.

16. A wrap-around device as claimed in claim 14, wherein the slot is closed at both ends.

17. A wrap-around device as claimed in claim 1, wherein the mechanical retaining means is a buckle.

18. A wrap-around device as claimed in claim 17, wherein the buckle is made from sheet material.

19. A wrap-around device as claimed in claim 17, wherein the buckle is electrically conductive.

20. A wrap-around device as claimed in claim 17, wherein the buckle is shaped to conform to the substrate.

21. A wrap-around device as claimed in claim 17, wherein the buckle is deformable to conform to the substrate.

22. A wrap-around device as claimed in claim 17, wherein the buckle is provided with slots and the heat-recoverable sheet material is a strip which passes through said slots to engage the buckle.

23. A wrap-around device as claimed in claim 17, wherein the buckle is provided with tines which engage loops in the heat-recoverable sheet material.

24. A wrap-around device as claimed in claim 17, wherein the buckle comprises both a slot through which the heat-recoverable sheet material passes and a tine which passes through a loop in the heat-recoverable sheet material.

25. A method of forming a wrap-around connection to a substrate comprising wrapping a length of heat recoverable sheet material about the substrate, engaging opposed edge regions of said sheet material with mechanical retaining means, said mechanical retaining means being provided with receiving means for an electrical component, positioning an electrical component in said receiving means, and heating said sheet material to cause recovery and electrically connect said electrical component to said substrate.

26. A method of forming a wrap-around connection to a substrate comprising wrapping heat-recoverable sheet material about the substrate to bring edge regions into an opposing relationship, positioning mechanical retaining means to engage the opposed edge regions so that the surface of the heat-recoverable sheet material and mechanical retaining means after recovery of the sheet material lie substantially flush with the substrate without protuberances from its outer surface, positioning an electrical component between the sheet material and the substrate, heating the sheet material to cause recovery and to electrically connect the electrical component to the substrate.

27. A wrap-around connection made in accordance with the method of claims 25 or 26.

* * * * *